H. C. FORD.
POWER TRANSMITTING MECHANISM.
APPLICATION FILED DEC. 28, 1916. RENEWED JAN. 2, 1919.

1,317,916.

Patented Oct. 7, 1919.
2 SHEETS—SHEET 1.

Inventor
Hannibal C Ford
By his Attorneys
Rosenbaum, Stockbridge & Borst

H. C. FORD.
POWER TRANSMITTING MECHANISM.
APPLICATION FILED DEC. 28, 1916. RENEWED JAN. 2, 1919.
1,317,916.
Patented Oct. 7, 1919.
2 SHEETS—SHEET 2.
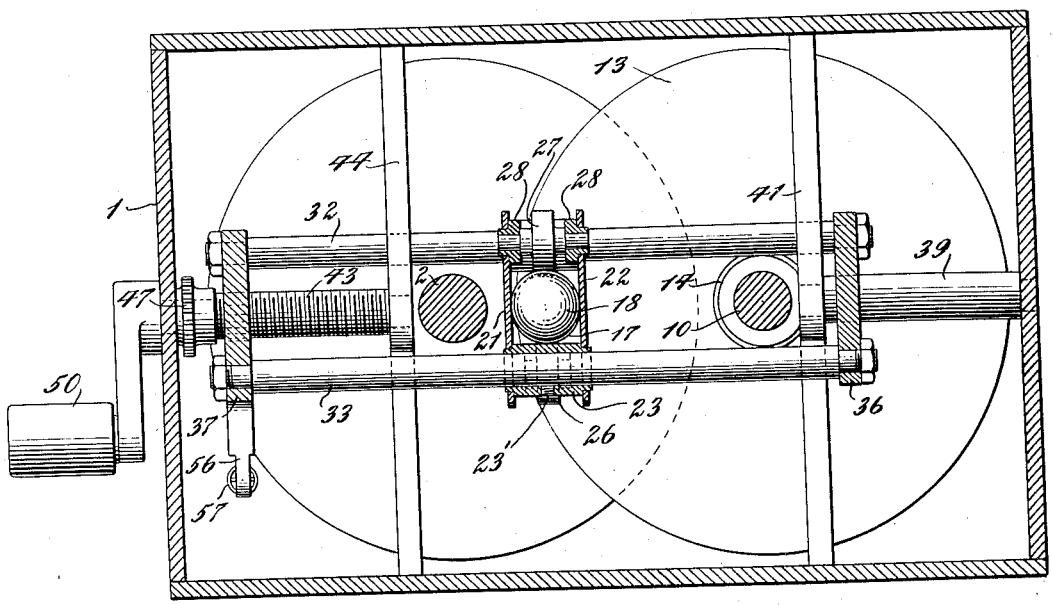
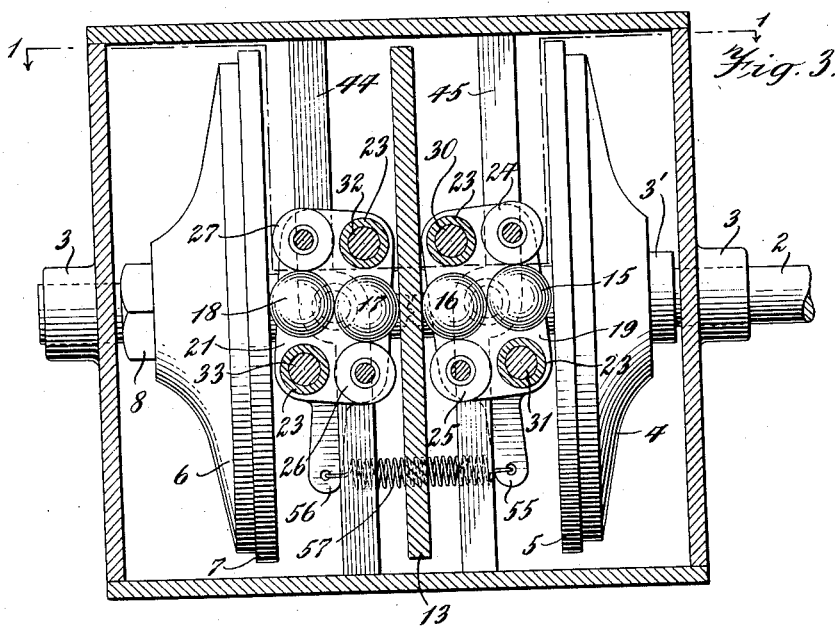
Inventor
Hannibal C. Ford
By his Attorneys
Rosenbaum, Stockbridge & Borst

UNITED STATES PATENT OFFICE.

HANNIBAL C. FORD, OF NEW YORK, N. Y., ASSIGNOR TO FORD INSTRUMENT COMPANY, INC., A CORPORATION OF NEW YORK.

POWER-TRANSMITTING MECHANISM.

1,317,916.

Specification of Letters Patent.   Patented Oct. 7, 1919.

Application filed December 28, 1916, Serial No. 139,284. Renewed January 2, 1919. Serial No. 269,392.

*To all whom it may concern:*

Be it known that I, HANNIBAL C. FORD, a citizen of the United States, residing at the city of New York, in the borough of Queens and State of New York, have invented certain new and useful Improvements in Power-Transmitting Mechanism, of which the following is a full, clear, and exact description.

This invention relates to power transmissions and more particularly to transmissions in which the power is transmitted through a plurality of parts in rolling contact.

One of the objects of the invention is to provide a power transmission of this character by which changes in the speed of the driving or driven elements may readily be accomplished without any slippage of the power transmitting parts and by which these changes in speed may be effected without releasing the pressure between the various elements of the transmission.

Another object of the invention is to provide a power transmission of the character specified in which the pressures resulting from maintaining the parts of the transmission in rolling contact, will be self-contained; *i. e.*, will be carried by the parts of transmission and will not require thrust bearings or other devices to sustain the pressures.

Still another object of the invention is to provide a plurality of power transmitting mechanisms which are so constructed and arranged that they form a single unitary structure of a simple and compact construction.

A further object of the invention is to provide a transmission in which the pressures between the parts connecting the driving and driven elements and in rolling contact therewith, may be increased with the load upon the driven element so as to prevent any slippage of the parts.

Other objects of the invention are to provide a simple construction for supporting the rotatable members which transmit the power from the driving to the driven element.

With these objects in view, the invention consists of the constructions and combinations which will be hereinafter described in detail in the specification and particularly pointed out in the appended claims.

In the accompanying drawings:

Fig. 2 is a vertical section taken on the line 2—2 of Fig. 1; and

Fig. 3 is a vertical section taken on the line 3—3 of Fig. 1, the section in each instance being taken in the direction of the arrows and the shafts and other portions of the power transmission being shown in full for the sake of clearness.

Figure 1:
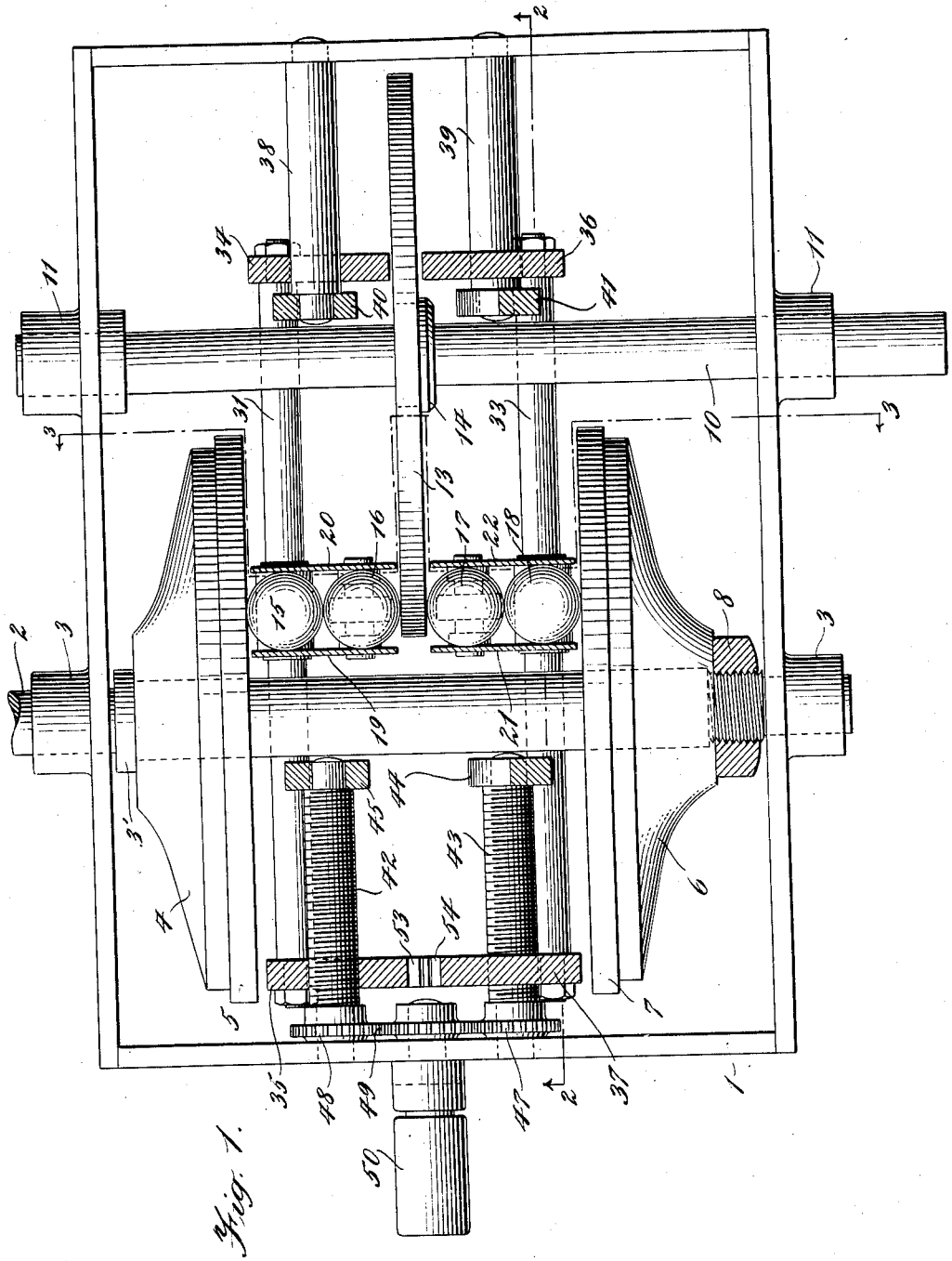
Figure 1 shows a horizontal section of a power transmission taken on the line 1—1 of Fig. 3, and embodying the principles of the invention.

In my application Serial No. 83,749, filed March 13, 1916, there is disclosed a variable speed mechanism which has some of the characteristics of the present invention, the power being transmitted from a driving to a driven element by a pair of balls in rolling contact with each other and with the driving and driven element, respectively.

The power transmission shown is of a similar construction and comprises an outer casing 1 on which is mounted a shaft 2, the shaft 2 being supported upon suitable bearings 3. Mounted upon this shaft adjacent its upper end as is shown in Fig. 1, is a collar 3' against which abuts a circular disk 4 provided with a hardened face plate 5. Also mounted upon the shaft 2 adjacent its lower end is a second disk 6 having a face plate 7. The shaft 2 is threaded for a portion of its length just below the end of the disk 6 and a nut 8 mounted on the threaded portion adjusts the distances between the plates 5 and 7 of the two disks the purpose of which will be later referred to.

A second shaft 10 also mounted in suitable bearings 11 and 12 carried by the casing 1, is arranged parallel to the shaft 2. This shaft carries a single disk 13 which in the construction shown is secured to the shaft 10 by means of a sleeve or collar 14. The disk 13 is arranged intermediate to and equidistant from the disks 4 and 6. Interposed between the disk 13 and the disks 4 and 6, respectively, are two sets of balls, the balls of one set being designated 15, 16 and the other 17, 18. These balls transmit the power of the driving disks 4 and 6 to the driven disk 13 and are maintained in position by cages which surround the balls. Each cage is formed of two side plates of rectangular shape, the plates of the two cages being numbered 19, 20 and 21, 22, respectively. The plates of each cage are rigidly secured together and maintained in spaced relation by bushings 23 having ends of reduced diameters passing through suitable alining openings at diagonally opposed corners of the plates. Disposed between the side plates at the other two corners, are rollers or other anti-friction devices. The rollers of the two cages are numbered 24, 25, 26 and 27, the rollers 24 and 25 being in rolling contact with the balls 15 and 16, respectively, and the rollers 26 and 27 being in rolling contact with the balls 17 and 18, respectively. These rollers are in each instance mounted in suitable bushings 28 secured in openings in the side plates of the cages (see Fig. 3) so that they will turn freely. The cages for each set of balls are mounted upon frames consisting of rods which pass through the bushings 23, the cage for the balls 15, 16 being mounted upon rods 30 and 31, and the cage for the balls 17 and 18 upon rods 32 and 33. Set screws 23' carried by the bushings engage the rods and hold the cages in any adjusted position thereon. The rods of each pair run parallel to each other and are connected at their ends to frame pieces, the rods 30 and 31 being connected by the frame pieces 34 and 35, and the rods 32 and 33 by frame pieces 36 and 37. These frame pieces are of rectangular shape and are of substantially the same size as the side plates forming the cages. The frame pieces 34 and 36 are respectively mounted for rotation upon stationary shafts 38 and 39, each of which is supported at one of its ends by the casing 1 and at its other ends by upwardly extending standards 40 and 41. In the same manner the frame pieces 35 and 37 are rotatably mounted upon shafts 42 and 43 which are supported by the casing and the standards 44 and 45.

Each of the standards 38, 39, 44 and 45 comprises two offset legs which permit the rods 30 and 31 and 32 and 33 to rock without interference. The shafts 42 and 43 are threaded for substantially their entire length and engage with the threads in the openings in the frame pieces 35 and 37, through which these shafts pass. The shafts 42 and 43 have mounted thereon gear wheels 47 and 48, which gear wheels mesh with a center gear wheel 49 adapted to be rotated by the handle 50, the rotation of the handle causing the shafts 42 and 43 to rotate and causes the frame pieces 35 and 36 to travel therealong to bring about the displacement of the cages.

The frame pieces 35 and 37 have toothed projections 53 and 54 which mesh with each other so as to cause the cages to simultaneously rock upon the shafts 38, 39, 42 and 43. These frame pieces 35 and 37 are also provided with projecting lugs 55 and 56, which are connected by a tension spring 57.

As will be clear from Fig. 2 of the drawing, the balls 15 and 16 and 17 and 18, respectively, are not mounted so that their points of rolling contact with each other and with the disks 4 and 6 are parallel to the axis of the disks, as would be the ordinary construction, but are mounted so that the balls are slightly out of alinement with each other, the distance between the working faces of the disk 13 and the disks 4 and 6, respectively, being slightly less than the combined diameters of the two balls interposed therebetween, which distance is adjusted by rotating the nut 8.

As will also be clear from Fig. 2, the balls are maintained in this slightly offset position by means of the rollers carried by the cages, the roller 24 engaging the ball 15, the roller 25 engaging the ball 16, the roller 26 engaging the ball 17, and the roller 27 engaging the ball 18. The pressure exerted by these rollers upon the balls through the spring 57 is sufficient to maintain them in rolling contact and also tends to move the balls of each set in a direction to bring them into alinement.

If it is assumed that the shaft 2 is driven from any suitable source of power, and the disks 4 and 6 are rotated in the direction indicated by the arrows shown in Fig. 2, the balls 15 and 16 and 17 and 18, respectively, will also rotate, and since the disk 13 is the driven disk, this disk will exert a tendency upon the balls 16 and 17, tending to move them upwardly as viewed in Fig. 3, while the disks 4 and 6 will exert a tendency upon the balls 15 and 18, respectively, tending to move them downwardly. This movement of the balls is slight but even with the slightest movement the pressure between the balls and the surfaces of the disk will be increased and thereby slippage of the balls prevented. If the load upon the disk 13 is increased the tendency of the balls to move is increased which increases the amount of their displacement and hence the pressure between the balls and their respective working surfaces will also be increased; or in other words, the pressure between the balls and their working surfaces will increase automatically with the load upon the driven element.

In so far as this feature of the invention is concerned, it is not essential that balls be used, for the same arrangement could be utilized with rollers and other rotatable elements, if the continuously variable speed feature of the invention is not deemed necessary. However, to provide for the continuously variable speed of the driving and driven element, balls are essential and the changes in the speed may be obtained by rotating the handle 50, which will move the cages to the right or left of the position in which it is shown in Fig. 1, which, as is well known, will vary the speed ratio between the shafts 2 and 10. This movement of the balls may be accomplished without any slippage of the balls for the reason that since a plurality of balls is utilized between each pair of the disks, these balls are free to move in any direction without slipping, the balls being guided in this movement by the side plates of the cage, which hold the balls one above the other.

It will also be noted that the pressures between the balls and the disks are self-contained, by which is meant that the shaft 2, since it carries both of the disks 4 and 6, also carries the end thrust upon these disks, due to the pressure exerted upon the disks by the balls, which will eliminate any necessity for thrust bearings and like constructions. Furthermore the pressures upon the disk 13 are equalized by the pressure exerted upon it from opposite directions.

It should be further noted that the construction described provides two transmitting mechanisms, namely, the disks 4 and 13 and the balls 15 and 16, and the disks 6 and 13 and the balls 17 and 18, the disk 13 being common to both, and since in the present example this is the driven element it will be seen that these two transmitting mechanisms greatly increase the amount of power which can be transmitted. Where a plurality of transmitting mechanisms coöperate to drive one single member, it is essential that when the speed is varied by moving the balls, these balls be moved in such a manner that they will tend to drive the driven element at the same speed. This is obtained by the simultaneous movement of the balls as has been fully described.

I claim:

1. In a power transmission, a driving and a driven element, a plurality of contacting rotatable members interposed between said driving and driven elements, and means for automatically increasing the pressure between said members and said elements with an increase of load.

2. In a power transmission, a driving and a driven element, a plurality of contacting rotatable members interposed between said driving and driven elements, and means coöperating with said members to cause them to move to increase the pressure between them and said elements with an increase of load upon the driven element.

3. In a power transmission, a driving and a driven element, a plurality of contacting rotatable members interposed between said driving and driven elements, said rotatable members being normally out of alinement, and means coöperating with said members for holding them in position.

4. In a power transmission, a driving and a driven element, a plurality of contacting balls interposed between said driving and driven elements, and means for automatically increasing the pressure between said balls and said elements with an increase of load.

5. In a power transmission, a driving and a driven element, a plurality of contacting balls interposed between said driving and driven elements, and means coöperating with said balls to cause them to move to increase the pressure between them and said elements with an increase of load upon the driven element.

6. In a power transmission, a driving and a driven element, a plurality of contacting balls interposed between said driving and driven elements, said balls being normally out of alinement, and means coöperating with said balls for holding them in position.

7. In a power transmission, a driving and a driven element adapted to be rotated in one direction, a plurality of contacting rotatable members interposed between said driving and driven elements, said members being normally out of alinement and arranged to tend to come into alinement upon rotation of the driving element.

8. In a power transmission, a driving and a driven element adapted to be rotated in one direction, a plurality of contacting balls interposed between said driving and driven elements, said balls being normally out of alinement and arranged to tend to come into alinement upon rotation of the driving element.

9. In a power transmission, three rotatable elements, a set of contacting balls interposed between each of the two end elements and the third intermediate element, a part connecting the two end elements, a cage for each set of balls and means for simultaneously translating said cages.

10. In a power transmission, a shaft, two elements mounted on said shaft in spaced relation, a third element mounted intermediate the two first named elements and eccentric thereto, a set of balls interposed between each of said two first named elements and said intermediate element, a cage for each set of balls and means for simultaneously translating said cages.

11. In a power transmission, a shaft, two disks mounted on said shaft in spaced relation, a third disk mounted intermediate the two first named disks and eccentric thereto, a set of balls interposed between each of said two first named disks and said intermediate disk, a cage for each set of balls and means for simultaneously translating said cages.

12. In a power transmission, a shaft, two disks mounted upon said shaft, one of said disks being adjustable therealong, means for adjusting said disk, a third disk mounted intermediate said two first named disks and eccentric thereto, a set of balls interposed between each of said two first named disks and said intermediate disk, a cage for each set of balls and means for simultaneously translating said cages.

13. In a power transmission, a shaft, two disks mounted on said shaft, said shaft having a portion thereof threaded, a nut on said threaded portion engaging one of said disks, a threaded disk intermediate said two first named disks eccentric thereto, and a set of balls interposed between each of said first named two disks and said intermediate disk, a cage for each set of balls and means for simultaneously translating said cages.

14. In a power transmission, a driving and a driven element, a plurality of contacting balls interposed between said elements, a cage surrounding said balls comprising two side plates, and rollers mounted between said side plates.

15. In a power transmission, a driving and a driven element, a plurality of contacting balls interposed between said elements, a cage surrounding said balls comprising side plates, and a pair of diagonally disposed rollers mounted between said side plates.

16. In a power transmission, a driving and a driven element, a plurality of balls interposed between said elements, and a cage having a swinging movement surrounding said balls.

17. In a power transmission, a driving and a driven element, a plurality of balls interposed between said elements, and a pivotally mounted cage surrounding said balls.

18. In a power transmission, a driving and a driven element, a plurality of balls interposed between said elements, a cage surrounding said balls, and means associated with said cage for rocking it and for imparting to it longitudinal movement in a direction at right angles to its rocking movement.

19. In a power transmission, a driving and a driven element, a plurality of balls interposed between said elements, a cage surrounding said balls comprising two spaced side plates, members connecting diagonally disposed corners of said side plates for rigidly connecting said plates and for holding them in spaced relation, and rollers disposed at the two other diagonally disposed corners of said plates.

20. In a power transmission, a driving and a driven element, a plurality of contacting balls interposed between said elements, a cage surrounding said balls, rods passing through said cage, frame pieces secured to the outer ends of said rods, said frame pieces being pivotally mounted.

21. In a power transmission, a driving and a driven element, a plurality of balls interposed between said elements, a cage surrounding said balls, rods passing through said cage, frame pieces secured to the ends of said rods, pivotal supports for said frame pieces carried by said casing, one of said supports being rotatable, and means carried by said rotatable support and said corresponding frame piece for causing the frame piece to move therealong upon rotation of said support.

22. In a power transmission, a plurality of rotatable elements, a common rotatable element, power transmitting members interposed between said elements and said common rotatable element, cages surrounding said members, and means for imparting simultaneous movement to the cages.

23. In a power transmission, a driving and a driven element, a plurality of balls interposed between said elements, a cage surrounding said balls, a frame carrying said cage, and means for imparting a rectilinear movement to said frame.

24. In a power transmission, a driving and a driven element, a plurality of contacting balls interposed between said elements, a cage surrounding said balls, a frame, said cage being adjustably mounted on said frame, and means for imparting a rectilinear movement to said frame.

25. In a power transmission, a driving and a driven element, a plurality of contacting balls interposed between said elements, a cage surrounding said balls, a frame, said cage being adjustably mounted on said frame, and means for imparting a rectilinear and swinging movement to said frame.

26. In a power transmission, a driving and a driven element, a plurality of contacting balls interposed between said elements, a cage surrounding said balls, a frame, said cage being adjustably mounted on said frame, and said frame being slidably mounted.

27. In a power transmission, a driving and a driven element, a plurality of contacting balls interposed between said elements, a cage surrounding said balls, a frame, said cage being adjustably mounted on said frame, and said frame being slidably and pivotally mounted.

In witness whereof I subscribe my signature in the presence of two witnesses.

HANNIBAL C. FORD.

Witnesses:
WALDO M. CHAPIN,
MARY G. HART.